Figure 1:
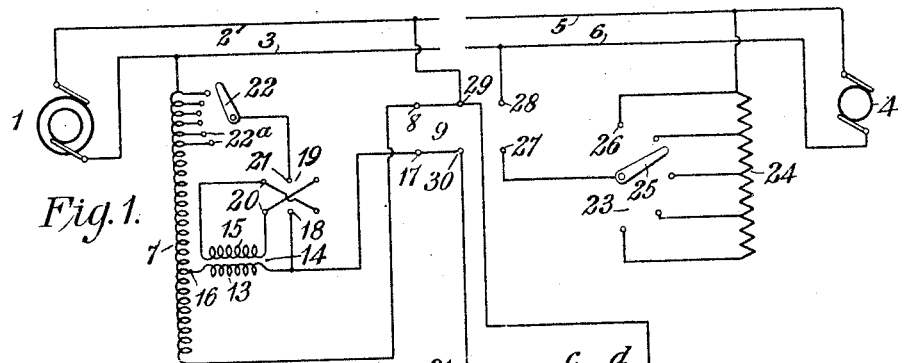

B. G. LAMME.
SYSTEM OF CONTROL FOR ELECTRIC MOTORS.
APPLICATION FILED APR. 5, 1907.

964,794.

Patented July 19, 1910.
2 SHEETS—SHEET 1.

WITNESSES:
C. L. Belcher
Otto S. Schairer

INVENTOR
Benjamin G. Lamme
BY
Finley G. Carr
ATTORNEY

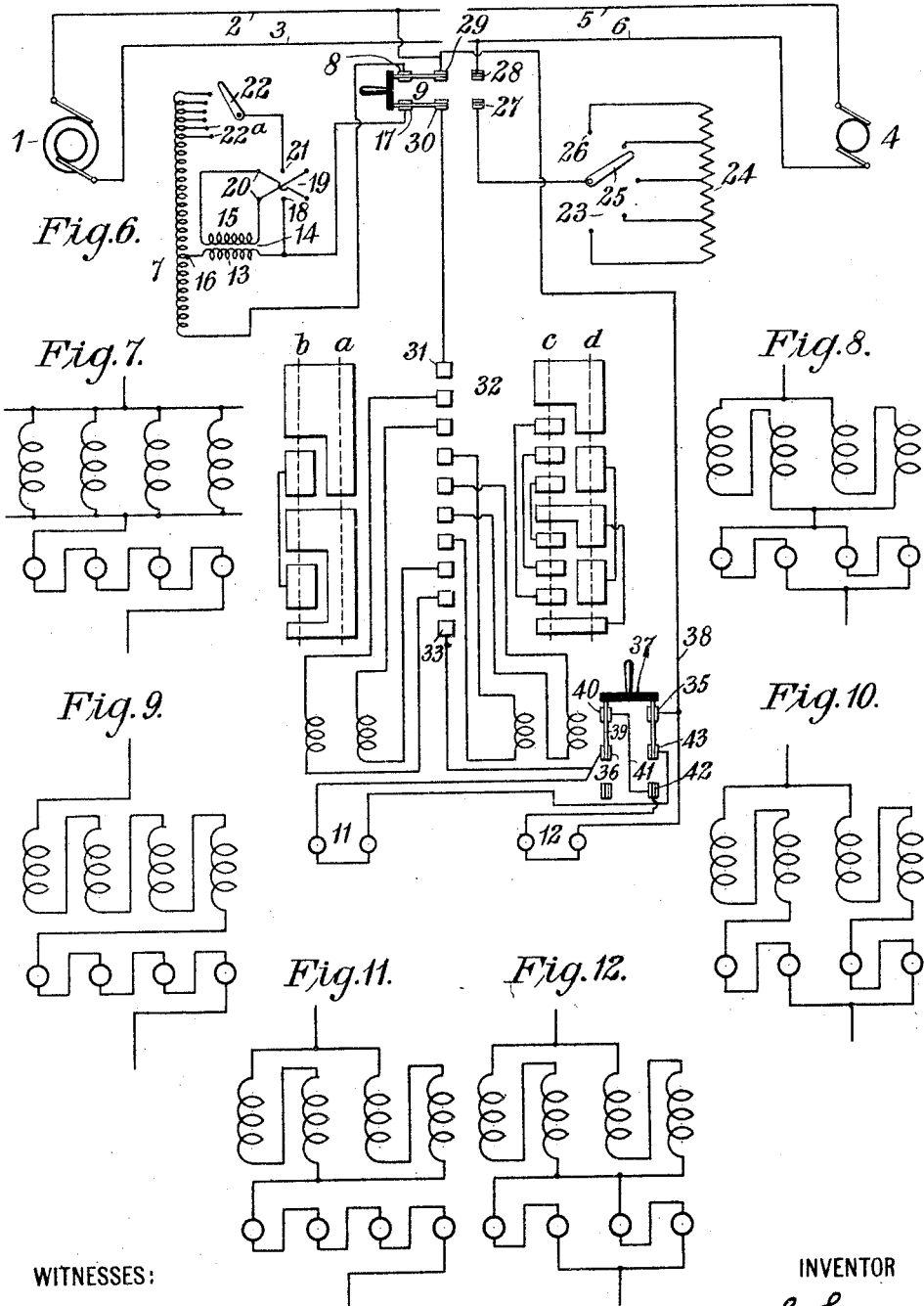

UNITED STATES PATENT OFFICE.

BENJAMIN G. LAMME, OF PITTSBURG, PENNSYLVANIA, ASSIGNOR TO WESTINGHOUSE ELECTRIC & MANUFACTURING COMPANY, A CORPORATION OF PENNSYLVANIA.

SYSTEM OF CONTROL FOR ELECTRIC MOTORS.

964,794.   Specification of Letters Patent.   Patented July 19, 1910.

Original application filed May 3, 1904, Serial No. 206,184. Divided and this application filed April 5, 1907. Serial No. 366,504.

*To all whom it may concern:*

Be it known that I, BENJAMIN G. LAMME, a citizen of the United States, and a resident of Pittsburg, in the county of Allegheny and State of Pennsylvania, have invented a new and useful Improvement in Systems of Control for Electric Motors, of which the following is a specification, this application being a division of my application, Serial No. 206,184, filed May 3, 1904.

My invention relates to systems of control for electric motors, and particularly to systems for controlling motors of the commutator type that are adapted to operate on either alternating or direct current.

The object of the invention is to provide means for so controlling the circuits of motors of the character indicated that they may be operated economically and efficiently on either alternating or direct current.

If the proper alterations are made in the design and construction of electric motors having commutators and which have ordinarily been operated by means of direct current energy, such motors may also be operated efficiently and satisfactorily by means of alternating current energy, and in many cases it has become quite desirable to so construct the motors and arrange their connections with the controlling devices that they may be operated by means of either alternating or direct current energy.

Four motors are ordinarily employed on a car when the amount of power required for its operation is large, and it has been found most expedient to construct such motors for normal operation on 250 volts, two motors being connected in series between five hundred volt mains.

In certain cases, the controlling apparatus may be exactly the same, whether operating on alternating or direct current, and it is evident that a series-parallel method of control may be employed; that is, the motors may be connected all in series for starting and low speed running conditions and in series-parallel relation to each other for the higher speeds. One disadvantage, however, of operating alternating current motors by means of this series-parallel method of control, as usually practiced, lies in the fact that each two hundred and fifty volt motor has only one hundred and twenty-five volts applied to its terminals, when required to give full load torque at practically zero speed.

If a series-parallel method of operation is used when operating on alternating currents, it becomes necessary to pass into the parallel position of the controller in order to obtain a higher torque or to attain a higher speed, and therefore, with this arrangement, there is no gain in operating the motors by means of the series-parallel method of control. In starting, practically all the drop in voltage in the motors occurs in the field magnet windings, so that if these windings are connected in series-parallel or in parallel relation to each other and the armature windings are connected in series, the voltage absorbed by the field magnet windings will be reduced when starting and some benefit is derived from the series connection of the armatures. In this manner the ratio of the armature strength to the field strength is increased, which is an economical and desirable condition for starting. As this ratio is increased, greater armature current is required for a given torque than is required when the field magnet windings are connected all in series, but the current is less than is required if it is necessary to pass to a series-parallel connection of the motors in order to obtain the desired starting torque. This arrangement, therefore, provides economical starting conditions and also permits of running at low speeds with the armatures connected all in series. It has also been found desirable in practice to provide means for altering the ratio of field ampere turns to armature ampere turns when changing from one character of energy to the other so that the ratio may be greater when operating by direct current than when operating by alternating current. In Patent No. 794,362, granted to Westinghouse Electric & Manufacturing Company, upon an application filed by me, is claimed both generically and specifically a means for effecting this result. According to my present invention, the desired alteration in the ratio of the ampere turns is effected by adjusting the circuit relations of the field magnet and armature windings of the motors.

My invention is illustrated in the accompanying drawings, in which—

Figure 1 is a diagrammatic view of a system comprising suitable controlling devices for the motors. Figs. 2, 3, 4 and 5 are diagrams illustrating the conditions of the circuits corresponding to the various positions of the controller shown in Fig. 1. Fig. 6 is a diagrammatic view of another system comprising suitable controlling apparatus for the motors. Figs. 7, 8, 9 and 10 are diagrams illustrating the conditions of the circuits corresponding to the various positions of the controller shown in Fig. 6. Figs. 11 and 12 are diagrams illustrating modifications of the methods illustrated in the preceding figures.

Referring now to Fig. 1, it is seen that alternating current energy is supplied from a suitable source 1 to line conductors 2 and 3 and direct current energy from a suitable source 4 to line conductors 5 and 6. One terminal of a main transformer winding 7 is connected to line conductor 3 and the other terminal to terminal 8 of a switch 9 provided for the purpose of changing the kind of energy supplied to the pairs of motors 11 and 12 from alternating to direct current. One terminal of a secondary winding 13 of a series transformer 14, having a primary winding 15, is connected with a point 16 in the winding 7 that is intermediate the terminals thereof, and the other terminal is connected to terminal 17 of the switch 9 and to terminal 18 of a reversing switch 19. The terminals of the primary winding 15 are connected respectively to terminals 20 of the reversing switch 19, and terminal 21 is connected to an arm 22 which is adapted to engage respectively with contact terminals 22$^a$, which are connected to suitable points in the winding 7. This portion of the apparatus provides suitable means for varying the voltage supplied to the motors when operating on alternating current, the speed being varied by properly manipulating the reversing switch 19 and the arm 22.

Means for varying the speed of the motors when operating on direct current may be a suitable rheostat 23 comprising a subdivided resistance element 24 connected to the line conductor 5 and a suitable arm 25, which is adapted to make contact with terminals 26 connected at various points to the resistance 24. The arm 25 is connected to terminal 27 of the switch 9, and terminals 28, 29 and 30 of the switch 9 are connected respectively to line conductors 6 and 2 and contact finger 31 of controller 32. Terminal 29 of the switch 9 is also connected to contact finger 33 of the controller 32. If switch 9 is in the position shown in full lines in Fig. 1, alternating current energy is supplied to the controller 32, but if the switch is in position to connect terminals 29 and 30 respectively with terminals 28 and 27, direct current is supplied to the controller 32. This switch may be operated manually or it may be operated automatically by suitable devices when a change is made from alternating current to direct current or vice versa; that is, the system may be so organized that a change of supply of energy from alternating to direct current will operate the switch 9 automatically without the attention of the operator.

The controller 32 represents a suitable device for adjusting the connections of the field and armature windings with reference to each other, the conducting strips or segments to the left of the contact fingers being provided for the purpose of adjusting the connections of the field magnet and armature windings when operating on alternating current and the strips or segments shown to the right of the contact fingers 31 being for the purpose of adjusting the connections of the field magnet and armature windings when operating on direct current, the said strips to the right and to the left being adapted to engage properly with the contact fingers.

Figure 2:
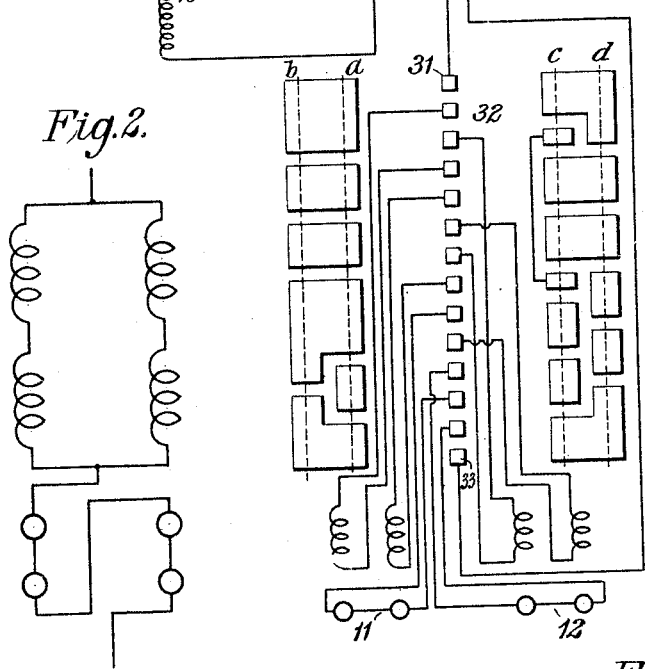
Figure 3:
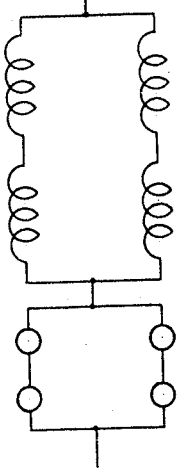

If it is desired to operate the motors by means of alternating current energy, the switch 9 should occupy the position shown in full lines and the controller should be moved to the position $a$, in which position the field magnet windings are connected two in series and two in parallel and the armature windings all in series, as shown in Fig. 2, these connections being for starting conditions and lower speeds. The speed of the motors may then be varied by varying the voltage supplied thereto by means of the reversing switch 19 and the arm 22, up to approximately half speed. In the position $b$ of the controller, the field magnet windings are still connected in the series-parallel relation to each other, but the relations of the armature windings are changed from the series connection to a series-parallel connection, as shown in Fig. 3, and the motors may then be brought up to full speed.

Figure 4:
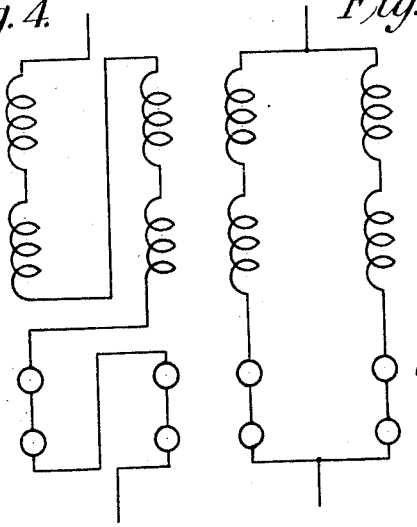
Figure 5:
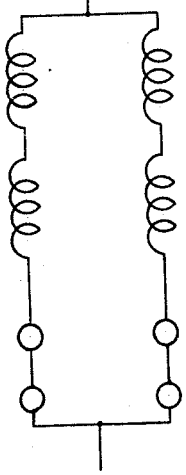

If it is desired to operate the motors by means of direct current energy, the switch 9 is thrown so as to connect the terminals 29 and 30 respectively with the terminals 28 and 27 and the controller 32 is moved to the position $c$ for starting conditions of the motors, and the field magnet and armature windings are then connected all in series, as indicated in Fig. 4. The speed of the motors may then be varied by the operation of the arm 25 of the rheostat 23. The motors may be connected in the ordinary series-parallel relation to each other, as indicated in Fig. 5, by the movement of the controller to position $d$ and they may then be brought to full running speed by gradually cutting the resistance 24 out of the circuit.

The controller in the system shown in Fig. 6 is adapted to connect the field magnet and armature windings in slightly different relations to each other from those shown in Figs. 2, 3, 4 and 5. In this figure, terminal 29 of the switch 9 and contact finger 33 are respectively connected to terminals 35 and 36 of a switch 37 provided for the purpose of connecting the armature windings of the motors in series or in series-parallel relations to each other, as desired. If the switch 37 is in the position shown, current will flow from the finger 33 to switch terminal 36, and thence in two parallel paths to conductor 38, one path being through blade 39, terminal 40, cross-conductor 41, terminal 42 and armatures 12 and the other path being through armatures 11, switch terminal 43, blade 44 and terminal 35. If the switch 37 is in its other closed position, the circuit from finger 33 is through terminal 36, armatures 11, terminal 43, blade 44, terminal 42 and armature 12. It will therefore be seen that when the switch 37 is in the position shown the armatures will be connected in series-parallel relation, and when it is in its other closed position the armatures will be connected in series relation.

If it is desired to operate the motors by means of alternating current energy, the switch 9 will occupy the position shown, the switch 37 its closed position opposite that shown, and the controller 32 will be moved to position $a$, the field magnet windings of the motors being then connected in parallel and the armature windings in series, as shown in Fig. 7. The speed of the motors may then be varied, up to approximately half speed, by the operation of the reversing switch 19 and the arm 22. In order to bring the motors up to full speed, the controller will be moved to position $b$, the switch 37 to the position shown, and the voltage varied as before, the field magnet windings and also the armature windings being then connected in series-parallel relation to each other, as shown in Fig. 8.

The operation of the motors by means of direct current energy may be exactly the same as that described in connection with Fig. 1, the connections of the field magnet and armature windings being shown in Figs. 9 and 10. In order to secure these connections of the motors, it is necessary to turn the movable member of the switch 9 into engagement with the contact terminals 27 and 28, the movable member of the switch 37 to the position opposite that shown, and the controller to the position $c$ for starting conditions, such as are shown in Fig. 9; and the switch 37 to the position shown, and the controller to position $d$ for running conditions such as are shown in Fig. 10. It may be desirable, however, to connect the field magnet and armature windings for starting and running conditions of the motors as shown respectively by Figs. 11 and 12, it being necessary, in order to obtain these connections, to place the controller in the position $d$ and to throw the switch 37 into the position opposite that shown for starting conditions, such as those shown in Fig. 11, and then to throw the switch to the position shown for the running conditions, such as are shown in Fig. 12.

While I have shown and described suitable devices for controlling the circuits of the motors and the voltages applied thereto, I do not limit myself to such specific means, since it is evident that many other suitable arrangements of the controlling devices may be employed and it is possible to combine all of the devices into a simple and compact piece of apparatus having one or more controller drums for adjusting the connections of the circuits. Other specific means may be devised for connecting the armature and field magnet windings of motors in such relations as to alter the ratios of the ampere turns of those windings when changing from one character of energy to another or when effecting changes in the speed of operation, and I desire my invention to be construed broadly to cover all such means, though they are not here specifically shown and described.

I claim as my invention:

1. The combination with a plurality of electric motors having field magnet and armature windings, of means for connecting the motors alternately to a source of alternating current and to a source of direct current, and means for adjusting the connections of said windings to obtain a comparatively small number of field ampere turns when operating on alternating current and a larger number when operating on direct current.

2. The combination with a plurality of electric motors adapted to operate on either alternating or direct current, of means for adjusting the circuit relations of the field windings to obtain a comparatively small number of field ampere turns when operating on alternating current and a larger number when operating on direct current.

3. The combination with a plurality of electric motors adapted to operate on either alternating or direct current, of means for adjusting the circuit relations of the windings of said motors to vary the ratio of the ampere turns in the field magnet windings to those in the armature windings when changing from one character of energy to the other.

4. The combination with a plurality of electric motors adapted to operate on either alternating or direct current, and voltage adjustment devices corresponding to each character of current, of means for adjusting the circuit relations of the field magnet windings to obtain a comparatively small number of field ampere turns when operating on alternating current and also for lower speeds, and a larger number of field ampere turns when operating on direct current and at higher speeds.

5. The combination with a plurality of electric motors having series-connected field magnet and armature windings, of means for adjusting the circuit relations of the field magnet windings to obtain a comparatively small number of field ampere turns for each of a plurality of lower speeds and a larger number for each of a plurality of higher speeds.

6. The combination with a plurality of electric motors having field magnet and armature windings, of means for adjusting the circuit relations of said windings so that only a portion of the total current supplied to the armature windings traverses each of the field magnet windings while the total current traverses each of the armature windings for each of a plurality of lower speeds.

7. The combination with a plurality of electric motors having field magnet and armature windings, of means for adjusting the circuit relations of said windings so that only a portion of the total current supplied to the armature windings traverses each of the field magnet windings while the total current traverses each of the armature windings for each of a plurality of lower speeds and for connecting the armature windings so that only a portion of the total current traverses each of them for each of a plurality of higher speeds.

8. The combination with a plurality of electric motors adapted to operate on either alternating or direct current, of means for adjusting the circuit relations of the windings of said motors so that when operating on alternating current only a portion of the total amount of current supplied to the motors traverses each of the field magnet windings while the total amount traverses the armature windings for the lower speeds, and so that only a portion of the total amount of current traverses each of the armature windings for the higher speeds and for so arranging the circuit relations of the windings that, when operating on direct current, the total amount of current traverses both the field magnet and armature windings for the lower speeds and only a portion of the total amount traverses each of the windings for the higher speeds.

9. The combination with a plurality of electric motors having field magnet and armature windings, of means for connecting the field magnet windings in parallel relation to each other and the armature windings in series relation to each other for lower speeds, and for connecting the armature windings in series-parallel relation to each other for higher speeds.

10. The combination with a plurality of electric motors adapted to operate on either alternating or direct current, of means for connecting the field magnet windings of said motors in parallel relation to each other and the armature windings in series relation for the lower speeds and the armature windings in series-parallel relation to each other for the higher speeds when operating on alternating current, and for connecting the motors in series for lower speeds and in series parallel for higher speeds when operating on direct current.

11. In combination, a plurality of series motors adapted for operation on either alternating or direct current, and a control system arranged to connect said motors to a source of alternating current with the field connections of the motors arranged to give a comparatively small number of ampere turns and to a direct current source, two in series, with the field connections modified to give a comparatively large number of ampere turns.

In testimony whereof, I have hereunto subscribed my name this 29th day of March, 1907.

BENJ. G. LAMME.

Witnesses:
ELIZABETH LIVINGSTONE,
BIRNEY HINES.